(No Model.)
A. J. KECK.
PENCIL WITH MOVABLE LEAD.
No. 547,353. Patented Oct. 1, 1895.
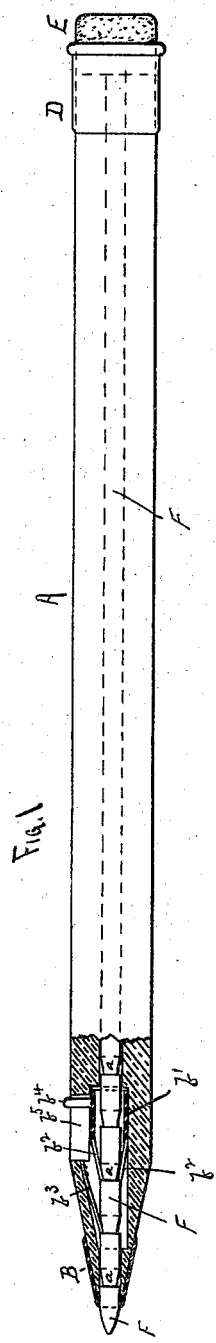
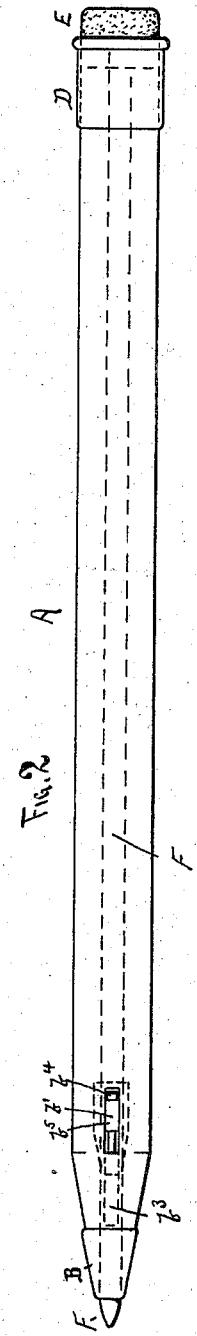

UNITED STATES PATENT OFFICE.

ALBERT J. KECK, OF ST. PAUL, MINNESOTA.

PENCIL WITH MOVABLE LEADS.

SPECIFICATION forming part of Letters Patent No. 547,353, dated October 1, 1895.

Application filed October 19, 1894. Serial No. 526,369. (No model.)

*To all whom it may concern:*

Be it known that I, ALBERT J. KECK, a citizen of the United States, residing at St. Paul, in the county of Ramsey and State of Minnesota, have made certain new and useful Improvements in Pencils with Movable Leads, of which the following is a specification.

This invention relates to pencils with movable leads; and it consists in the construction, combination, and arrangement of parts, as hereinafter shown and described and specifically pointed out in the claim.

In the drawings, Figure 1 is a semisectional side elevation, and Fig. 2 is a plan view, of a pencil with my improvement attached thereto. Fig. 3 is a perspective view of the lead-adjusting sleeve detached.

A is the casing, which may be of any suitable material, but preferably of wood, and preferably with a conical metal ferrule B upon the "point" end and with a cap D upon the upper end, the latter with or without a rubber eraser E.

F is the lead or crayon, which fits the interior of the casing A, being inserted by removing the cap D, and adapted to project beyond the point of the ferrule to the usual extent, as shown. The surface of the crayon or lead F is formed irregular by channels or creases $a$, as shown, the irregularities being at equal distances apart throughout the entire length. These channels $a$ will preferably be formed in the lead when in a plastic state and will be formed with the sides next the lower or writing end of the pencil, substantially at right angles to the surface of the lead and with the other side inclined backward, as shown, so that when worn or broken off at the channels the end of the lead will be partially pointed, thereby insuring the self-sharpening of the end of the lead projected beyond the point B. Fitting over the lead in a recess formed in the casing A is a small sleeve or ferrule $b'$, having its forward end conical and split into sections or fingers $b^2$, as shown in Figs. 1 and 3, the fingers $b^2$ being bent inward and adapted to rest in contact with the lead and within one of the channels $a$, as shown in Fig. 1. The metal of which the ferrule $b'$ is made will be of sufficient strength to cause the fingers $b^2$ to act as spring-pawls to prevent any backward movement of the lead D, while permitting it to be moved outward freely. A check-spring $b^3$ is attached to the interior of the ferrule B, or to wooden shank A, and rests against the lead F, as shown in Fig. 1. The ferrule $b'$ is provided with thumb-lug $b^4$, projecting outward through a slot $b^5$ in the casing A and ferrule B, so that the ferrule $b'$ may be moved forward and backward by the finger of the operator. By this simple arrangement if the ferrule $b'$ be pushed toward the point of the ferrule B by its lug $b^4$ the fingers $b^2$, acting against the edges of the channels $a$, will move the lead outward the distance of the space between two of the channels. Then when the lead is worn down to the ferrule another length may be thrust outward in the same manner, the check-spring $b^3$ preventing the lead being carried inward again by the backward movement of the ferrule $b'$. The ferrule B is shown extending backward for some distance upon the casing A, but it need extend only back a sufficient distance to protect the point of the wood of the casing. Between the channels $a$ the surface of the lead F is left in its original state, and the distance from the fingers $b^2$ to the point of the ferrule or the end of the casing A will be so gaged that one of the straight portions of the lead between the channels will come against the outer edge of the ferrule, so that the full strength of the lead will always be at the point where the side strains occur.

What I claim as new is—

In a pencil having a movable lead, the crayon having encircling channels or grooves at uniform intervals and formed straight on the side toward the writing end and inclined backward on the other side, and a sliding ferrule encircling said lead within the pencil casing and formed with spring fingers adapted to catch into the channels in the lead, to project the lead, substantially as and for the purpose set forth.

In testimony whereof I have hereunto set my hand in the presence of two subscribing witnesses.

ALBERT J. KECK.

In presence of—
C. N. WOODWARD,
J. D. BRAINARD.